March 1, 1927.

N. L. OLSON 1,619,308

MOTOR TRUCK CHASSIS

Filed Feb. 9, 1922     2 Sheets-Sheet 2

Inventor

Nels L. Olson,

By *Barthel & Barthel*

Attorneys

March 1, 1927.  N. L. OLSON  1,619,308
MOTOR TRUCK CHASSIS
Filed Feb. 9, 1922   2 Sheets-Sheet 1
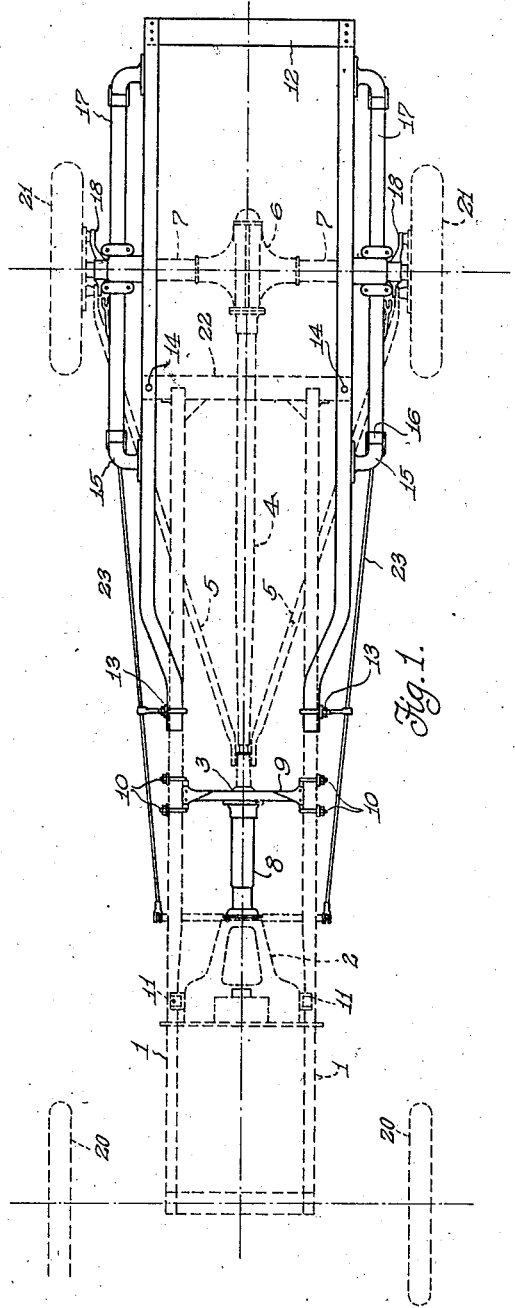
INVENTOR.
Nels L. Olson,
BY
ATTORNEYS Patented Mar. 1, 1927.

1,619,308

UNITED STATES PATENT OFFICE.

NELS L. OLSON, OF DETROIT, MICHIGAN.

MOTOR-TRUCK CHASSIS.

Application filed February 9, 1922. Serial No. 535,171.

This invention relates to a motor truck chassis and has special reference to an extension by which the wheel base and carrying capacity of a chassis may be increased with a minimum amount of labor, thus permitting of a light duty truck or similar vehicle being converted into a heavy duty truck or vehicle.

My invention aims to provide slip-on frames that may be made of various lengths and attached to the usual frame of a vehicle chassis to permit of different sizes of bodies being supported relative to the chassis, and associated with each slip-on frame are interchangeable spring suspension device to compensate for various load capacities. It will therefore be possible for the owner of a comparatively short and light vehicle to apply extensions to the chassis and its power transmission to obtain a running gear that will be suitable for a larger body, thus obviating the usual practice of disposing of a light duty vehicle in order to obtain a vehicle of greater load capacity.

My invention further aims to provide a chassis extension that is applicable to a well known type of standard truck chassis, and the construction by which I attain the above and other results will be hereinafter described and then claimed.

Reference will now be had to the drawing, wherein—

Figure 1 is a plan of the chassis extension, showing the same in full lines as applied to a standard chassis which is shown by dash lines, Fig. 2 is a side elevation of the same.

Figure 6:
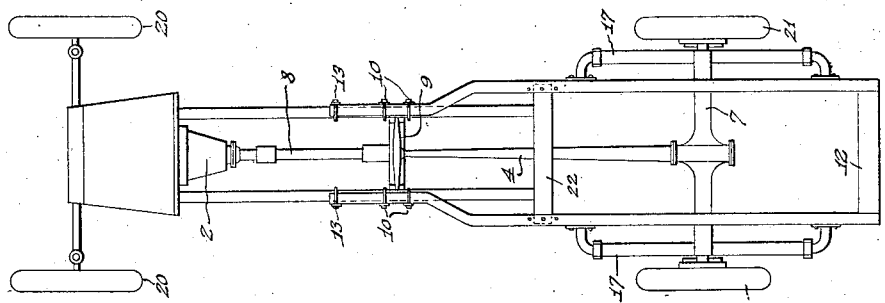
Fig. 6 is a similar view showing another position of the extension chassis and the large size of drive shaft assembly.
Figure 5:
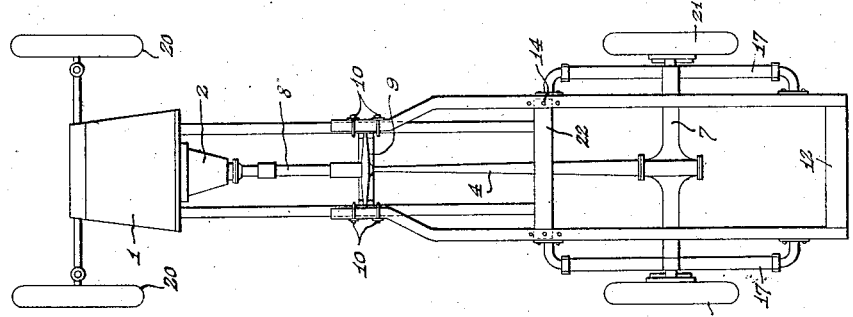
Fig. 5 is a plan of chassis extension which will provide a greater loading capacity than the chassis shown in either Figs. 3 and 4, this view showing an intermediate size of drive shaft assembly.
Figure 4:
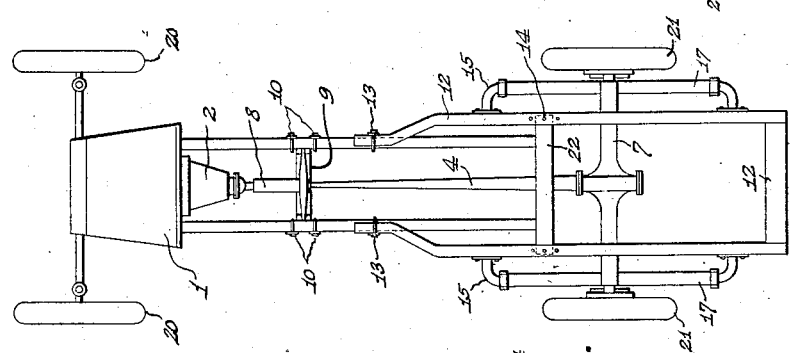
Fig. 4 is a view similar to Fig. 1, showing the extension chassis devoid of radius rods and illustrating a small size of drive shaft assembly.

In the drawing, the reference numeral 1 denotes, by the way of an example, the frame of a standard chassis as supported by a front axle assembly including steering wheels 20 and a rear axle assembly including a differential mechanism 6, a rear axle housing 7 and rear wheels 21.

Power is ordinarily transmitted from the forward end of the chassis to the differential mechanism 6 through a transmission mechanism 2 and a drive shaft housing 4, the drive shaft housing having a universal joint 3, and radius rods 5 with said rods extending in diverging directions to the rear axle assembly.

My extension includes a frame 12 of greater width than the chassis frame 1, and the extension frame 12 has its forward end contracted to correspond in width to the chassis frame 1, so that the forward end of the extension frame may be slipped over the rear end of the chassis frame and fastened to it by clips 13 and bolts 14. The clips 13 engage the chassis frame 1 intermediate the ends thereof and the bolts 14 engage in the rear transverse member or sill 22 of the chassis frame, thus tying the forward end of the extension frame to the rear end of the chassis frame to hold the extension frame as a prolongation of the chassis frame; parts of the extension frame being disposed in parallelism and in superposed relation to parts of the chassis frame.

The drive shaft housing 4 is uncoupled relative to the transmission mechanism 2 and pushed rearwardly so that the rear axle assembly is under the extension frame at a point intermediate the rear end of said extension frame and the transverse member 22, and in order that the rear end of the extension frame may be supported relative to the rear axle assembly, the sides of the extension frame are provided with hangers 15 and shackles 16 for semi-elliptical or cantilever springs 17, said springs being pivotally suspended from the upper ends of yokes or brackets 18 forming part of the rear axle assembly, such yokes or brackets affording an interchangeable spring suspension along the lines suggested by my Patent No. 1,380,408, granted June 7, 1921.

Shifting the drive axle housing 4 rearwardly would leave a gap between the transmission mechanism 2 and the universal joint 3, and it is at this gap that I install a cross member 9 which is connected to the chassis frame by clips 10. The universal joint 3 is located at this cross member and operably connected to a drive shaft housing 8 mounted between the transmission mechanism 2 and the cross member 9, the universal joint at the cross member permitting of oscillation and vertical movement of the rear axle assembly. With the extension drive shaft housing 8 fastened solidly to the transmission mechanism housing there is a stiff connection for extension shafts of a minimum length, and to avoid any weaving action between the supports 11 of the transmission and the cross member clips 10 another universal joint may be installed so that there will be a flexible connection at both ends of the drive shaft within the drive shaft housing 8 to prevent any binding action should the frames be twisted. This additional universal joint has not been shown as in the majority of instances the universal joint 3 at the cross member 9 is sufficient, to provide the necessary flexibility.

With the extension frame connected to the chassis frame I may use additional radius rods and brake rods 23 will be arranged so that the brakes of the rear axle assembly may be controlled.

Figure 3:
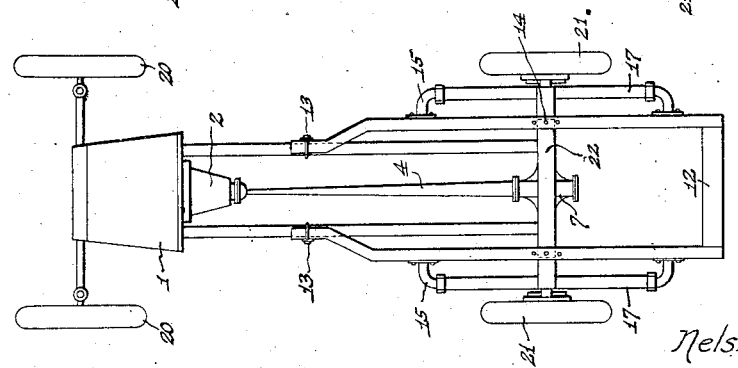
Fig. 3 is a plan of the chassis extension applied to a truck without changing the drive shaft assembly.

As pointed out in the beginning the extension is adapted to increase the wheel base and carrying capacity of the truck, and this has been brought out in Figs. 3 to 6 inclusive showing the manner in which the extension chassis may be shifted on the truck chassis and different sizes of drive shaft assemblies installed. As shown in Fig. 3 the chassis extension affords a wheel base of one hundred and twenty-four inches and this chassis capable of supporting a nine foot body. This is accomplished without changing the usual drive shaft assembly, but when the wheel base is to be increased it is necessary to provide extension drive shafts. The small size has been shown in Fig. 4 in which instance the transverse member 22 is at a point between the rear axle assembly 7 and the forward ends of the side springs 17, while the forward end of the extension frame 12 terminates behind the cross member 9.

Shifting the extension frame 12 rearwardly on the truck chassis to increase the wheel base and carrying capacity of the truck brings the transverse member 22 at the forward ends of the side springs 17 and when a longer drive shaft extension is installed the cross member 9 is located at the forward end of the extension frame.

A further extension has been shown in Fig. 6, necessitating a still longer drive shaft extension and in this instance the transverse member 22 is in front of the forward ends of the side springs 17 and the cross member 9 is behind the forward end of the extension frame.

It is in connection with these last two truck extensions that the extension frames may have the forward ends thereof elongated, for instance as shown in Fig. 6 and additional clips 10 employed for holding the long ends of the extension frames on the truck frame. This may not be actually necessary, but where the transverse member 22 is in close proximity to the cross member 9, then a rigid connection may be established by elongating the forward ends of the extension frames.

One embodiment of my invention has been illustrated, but it is to be understood that the structural elements are susceptible to such variations and modifications as fall within the scope of the appended claim.

What I claim is:—

Means adapted for changing the wheel base or carrying capacity of a truck of a known wheel base and carrying capacity into a truck for other optional wheel bases and capacities, wherein the truck includes chassis frames, a rear transverse member, a rear axle assembly having a brake mechanism, a drive shaft housing and a transmission, said means comprising extension chassis frames having the extreme rear ends thereof connected and otherwise devoid of transverse connections to the forward ends of said extension chassis frames, clips connecting the forward ends of said extension chassis frames to the truck chassis frames, brake rods supported by said clips and diverging rearwardly outside of the extension chassis frame to the brake mechanism of the rear axle assembly, said extension chassis frames being connected to the rear transverse member of the truck chassis, at a point in advance of the rear axle assembly, side springs supporting said extension chassis frames from said rear axle assembly with said side springs having points of attachment in advance of the transverse member of said truck chassis and in proximity to the rear connected ends of said extension chassis frames, and a drive shaft extension mounted in the truck chassis and connecting the truck transmission and drive shaft housing.

In testimony whereof I affix my signature.

NELS L. OLSON.